Oct. 17, 1944. J. B. DICKSON 2,360,480
REFLECTOR
Filed April 17, 1941 3 Sheets-Sheet 1

INVENTOR
JOHN B. DICKSON.
BY
ATTORNEYS.

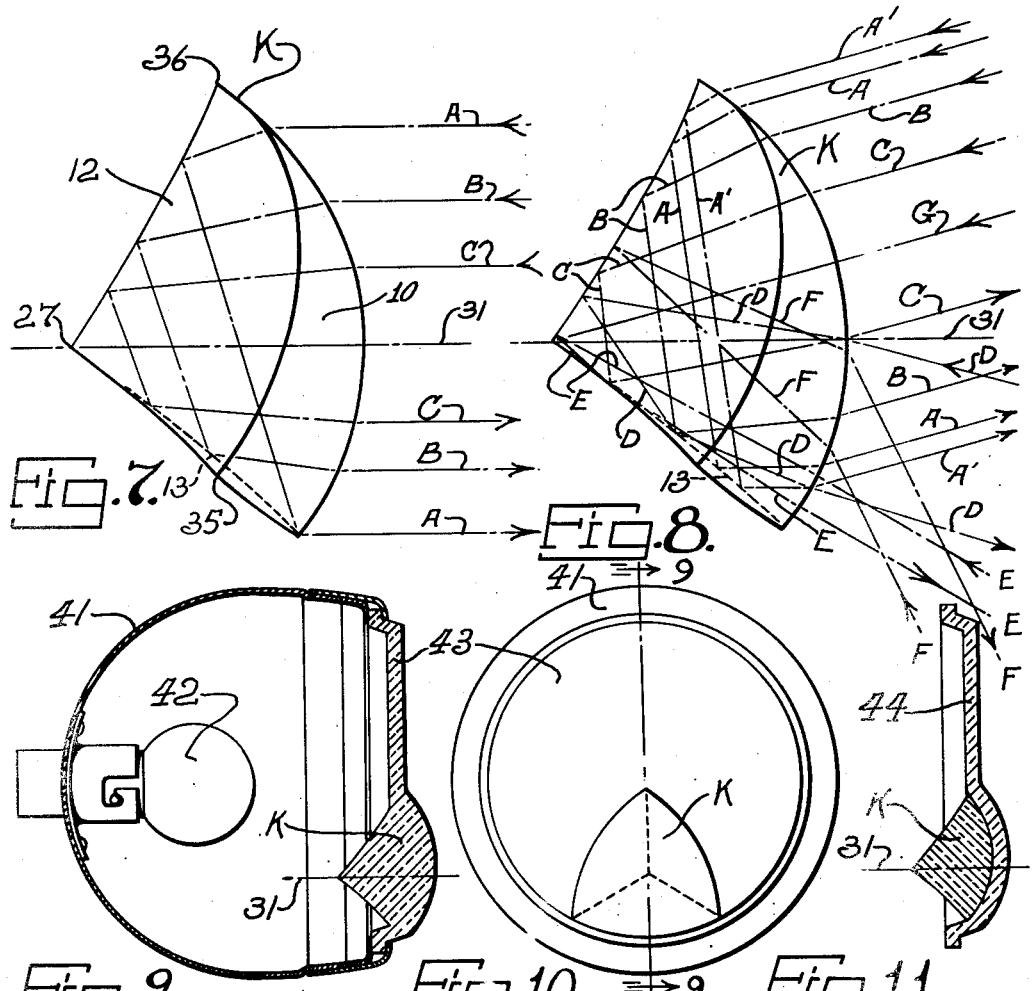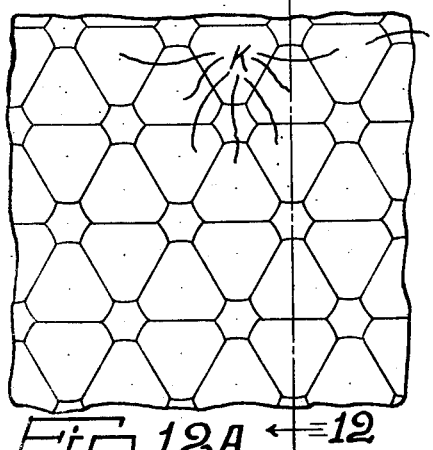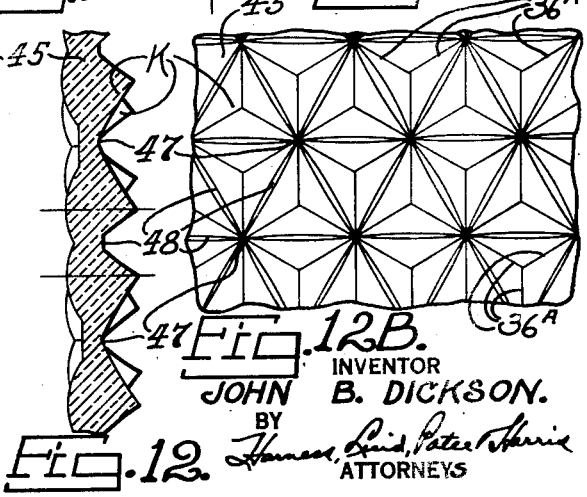

Oct. 17, 1944.　　　J. B. DICKSON　　　2,360,480
REFLECTOR
Filed April 17, 1941　　　3 Sheets-Sheet 3
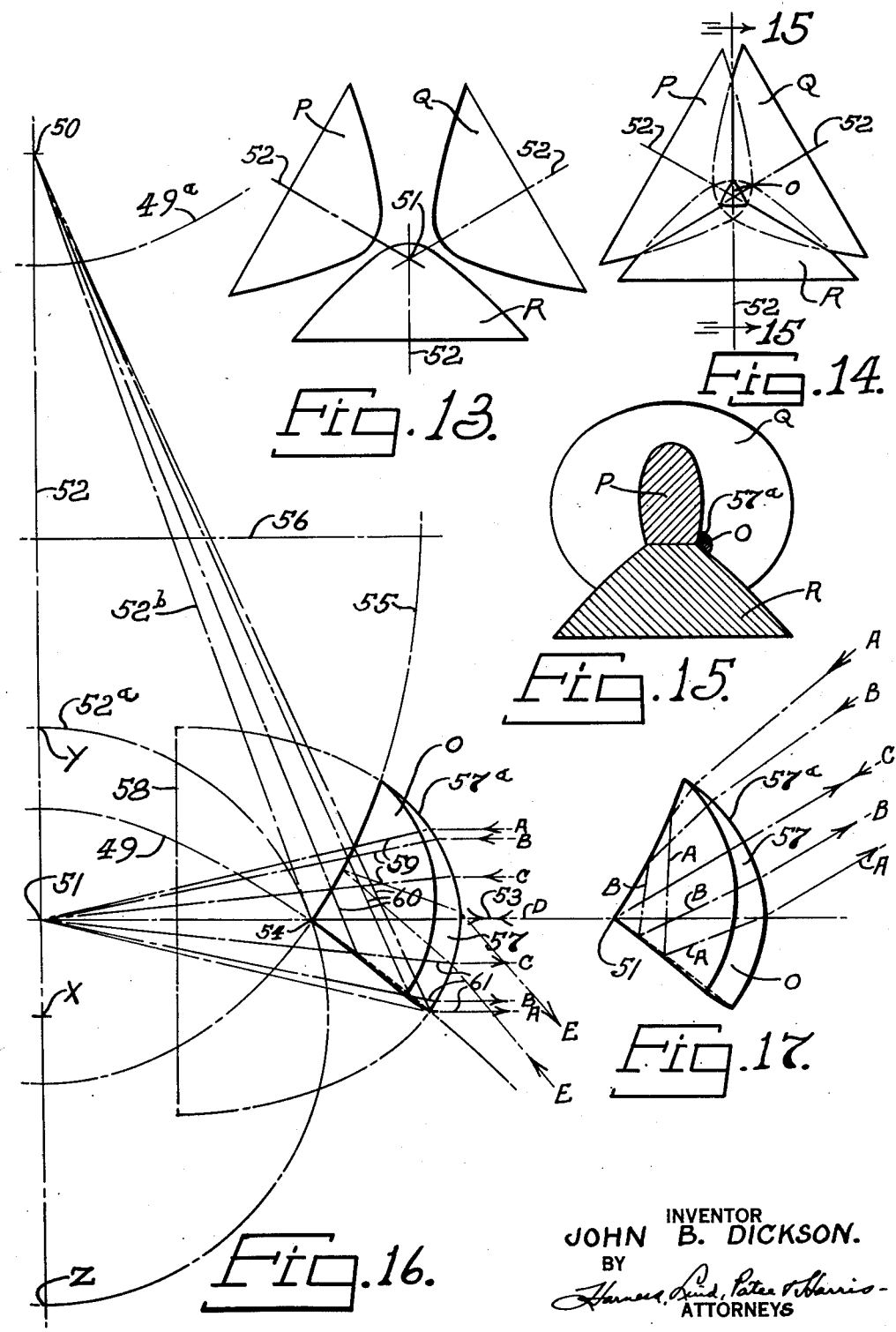
INVENTOR
JOHN B. DICKSON.
BY
ATTORNEYS Patented Oct. 17, 1944

2,360,480

UNITED STATES PATENT OFFICE 2,360,480

REFLECTOR

John B. Dickson, Highland Park, Mich., assignor to Chrysler Corporation, Highland Park, Mich., a corporation of Delaware Application April 17, 1941, Serial No. 388,977

14 Claims. (Cl. 88—82)

This invention relates to reflectors and the like and refers more particularly to improvements in optical systems and devices having a variety of uses including signs, signals, vehicle tail light lenses, vehicle warning devices, etc.

One object of my invention is to provide a reflector having improved characteristics of light reflection capable of returning light rays with improved efficiency back approximately to the light source at greater angles and throughout a greater range of effectiveness than with prior devices of the same general class.

Another object of my invention resides in the provision of an improved reflector which may be manufactured at relatively low cost.

Further objects of my invention are to provide an improved optical system affording high reflecting efficiency for a given reflector area or size; to provide a warning signal or reflector which may also be employed as a light transmitting medium as is desirable for use with tail light illuminated signals; and to provide an improved reflector which will lend itself in an improved manner to a wide variety of uses.

A further object of my invention is to provide a retro-directive reflector which does not require silvering and which presents an optical system which will provide improved performance and efficiency in functioning to reflect light back to approximately its point of origin without undue spread of the reflected light.

An additional object is to provide a reflector of the retro-directive class, sometimes referred to as an autocollimator, which will provide improved reflecting characteristics over well-known triple reflectors of the plane surface type in that, among other things, my reflector will inherently compensate for unavoidable irregularities in the molded glass or other plastic surfaces; also in providing a greater range of reflecting action than is afforded by prior retro-directive reflectors in general.

An additional object is to provide a reflector having triple reflecting properties over a relatively wide range in all directions of light approach and a further range or further ranges of double reflecting activity in addition to its triple reflecting action.

Another object is to provide an improved cluster arrangement of my reflectors for obtaining improved reflecting action and efficiency for a given overall size of reflecting medium.

Further objects and advantages of my invention will be more apparent from the following illustrative description of several embodiments which my invention may assume, reference being had to the accompanying drawings in which:

Fig. 7 is an enlarged view similar to Fig. 5 and illustrating the general action of light rays approaching the reflector parallel to its optical axis.

Fig. 8 is a like view illustrating the general action of light rays approaching the reflector at an angle to its optical axis.

Fig. 9 is a sectional elevational view of a vehicle tail lamp equipped with a lens embodying my reflector.

Fig. 10 is an elevational view of the same looking from the rear of the lamp toward the lens.

Fig. 11 is a sectional elevational view of a modified form of tail lamp lens embodying my invention.

Fig. 12 is a sectional elevational view of a plastic transparent body embodying my reflectors molded in multiple, the view being taken as indicated by line 12—12 of Fig. 12A.

Fig. 12A is a view looking at the front face of the Fig. 12 body.

Fig. 12B is a view looking at the rear face of the Fig. 12 body.

Fig. 13 is a diagrammatic view illustrating one step in the geometrical construction or concept of a further modification of my invention in evolving the Fig. 17 reflector.

Fig. 14 is a similar view illustrating a further step.

Fig. 15 is a transverse sectional elevational view taken as indicated by line 15—15 of Fig. 14.

Fig. 16 is a diagrammatical view illustrating a further geometrical development of the Fig. 17 reflector.

Fig. 17 is a view generally corresponding to Fig. 5 but illustrating a further modified form of my reflector as evolved by the geometrical system of Figs. 13 to 16.

Figure 1:
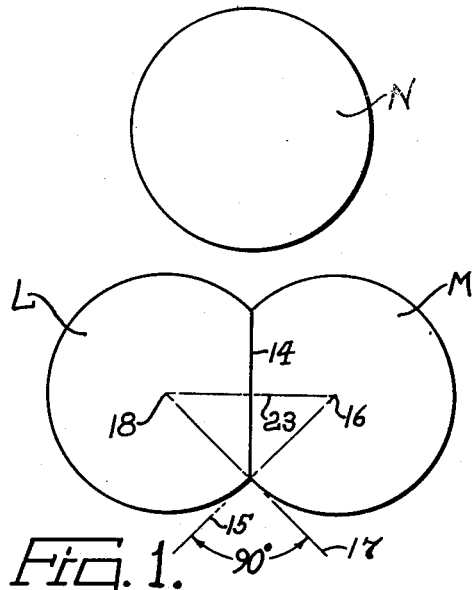
Fig. 1 is a diagrammatic view illustrating one step in the geometrical construction or concept of my reflector.
Figure 2:
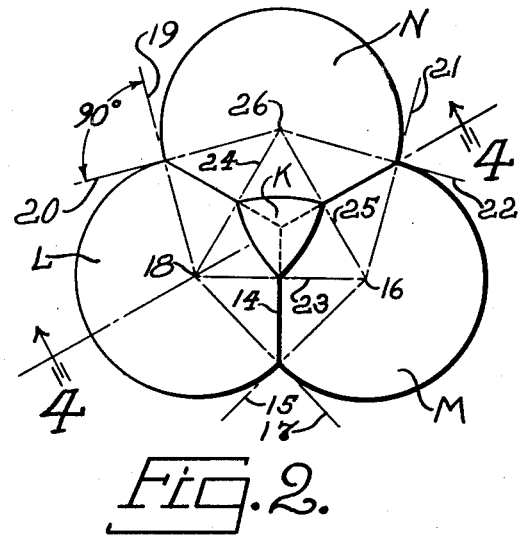
Fig. 2 is a similar view illustrating a further step.
Figure 4:
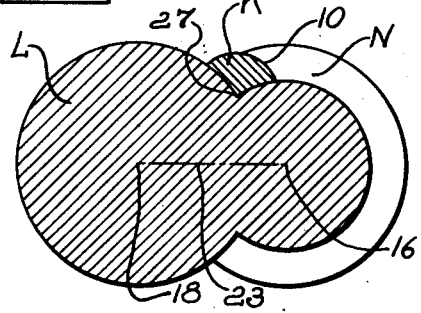
Fig. 4 is a sectional elevational view taken as indicated by line 4—4 of Fig. 2.
Figure 3:
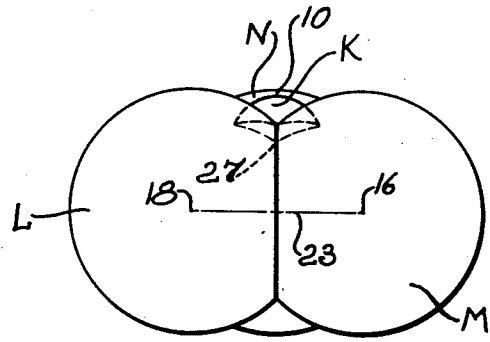
Fig. 3 is a front elevational view of the geometrical development of Fig. 2.

Referring to the drawings, my reflector K comprises a transparent body of glass or other suitable plastic of which a number are now available on the market, one being commonly known as Lucite which may be molded with great accuracy. The plastic body is preferably pressed or molded to the desired shape according to known methods and, in many instances, is of red color although obviously the color employed is a matter of choice and intended use of the reflector. In many instances a white body will be desired.

The reflector K comprises a collimating or condensing front face or lens portion 10 which is of non-planar or curving form of such shape as to efficiently coact in auto-collimating relationship with the triple reflecting surfaces 11, 12, 13 forming the rear of the reflector, these reflecting surfaces also being of non-planar or curving form. By preference, according to the form of my invention in Figs. 1 to 12B, the front face 10 is formed spherical and molded as smooth as possible by customary molding methods and by exercising a high degree of polish on the mold surface. Such molded surfaces may be defined as "mold-smooth" surfaces. Likewise the triple reflecting surfaces 11, 12, 13 are each formed spherical and molded as smooth as possible as in the case of the face 10. With the highest degree of mold polish the reflector surfaces will, by reason of the molding process, inherently have microscopic irregularities such that the reflector will deviate in accuracy from an optically perfect formation thereby giving a conical or spreading beam action back to the light source. An optically perfect reflector is obviously not desired for general commercial applications and can never be obtained by molding methods commonly employed. However, one of the problems in reflectors has always been to minimize the spread as much as possible by high mold polish and care in molding. My reflector, having curved surfaces, lends itself to production with improved accuracy in the minimization of surface irregularities as it is known that a non-planar surface, such as a mold, can be polished to a greater accuracy than a plane surface, especially where the non-planar surface is one of revolution or symmetrical about an axis.

In order to visualize the geometrical relationship of the surfaces of my reflector, let it be assumed that three spheres L, M, N of equal diameter are intersected as in Figs. 1 to 4. First, as in Fig. 1, assume spheres L and M to intersect along the common plane 14 until the tangent 15 to sphere L which intersects the center 16 of sphere M lies at 90° with a similar tangent 17 to sphere M which intersects tangent 15 and the center 18 of sphere L and which tangent 17 is co-planar with tangent 15 viz., tangents 15 and 17 lying in the same plane. With spheres L and M in this relationship, assume sphere N to be then intersected with spheres L and M as in Fig. 2 until tangents 19, 20 bear the same relationship to each other and to spheres N, L respectively as in the case of tangents 15, 17 in relation to each other and to spheres L, M. Likewise co-planar tangents 21, 22 are related to spheres N, M in identical fashion, each pair of tangents being 90° with each other. With the spheres thus related, as in Fig. 2, the lines 23, 24, 25 connecting the sphere centers 16, 18, 26 form an equilateral triangle.

In order for the illustrated relationship to be possible, the equal radius of each sphere must be less than the equal distance between the centers of any two of the three spheres. Furthermore the pairs of tangents 15, 17; 19, 20; and 21, 22 are those tangents which extend from the respective sphere centers 16, 18; 18, 26; and 16, 26 in the same general direction. For example tangents 15 and 17 are those which extend generally toward one another and not in opposite directions in which case, with the spheres arranged as in Fig. 2, such tangents would lie parallel to one another. For convenience the aforesaid pairs of co-planar tangents which extend for intersection in the same general direction may be referred to as conjugate tangents to distinguish them from the pair of tangents extending in generally opposite directions.

The triple reflecting surfaces 11, 12, 13 are formed by the surface portions of spheres L, M, N bounding or lying adjacent to the center 27 of the cavity formed by the intersecting spheres. The reflecting surfaces therefore are spherical concave segments of equal radii, the segments being surface portions of spheres intersecting such that the center of each sphere is spaced equidistant from the center of the other two spheres and having their conjugate tangents related as aforesaid. The cavity center 27 is the apex of reflector K and if a fourth sphere is now intersected with spheres L, M, N with the apex 27 as its center, this fourth sphere forms the reflector K and the surface 10, the natural boundary or margin between surface 10 and surfaces 11, 12, 13 being formed by the symmetrically disposed intersecting circular-segments 28, 29, 30.

The reflector K is symmetrical about the mechanical axis 31 which passes through the apex 27 whereas the reflector has three optical axes disposed approximately as indicated at 32, 33, 34 which are disposed symmetrically about axis 31. The optical axis of the reflector unit, as applied to a retro-directive reflector, is that axis of light approach which results in equal reflecting ranges or zones around such axis whereas the mechanical axis is that axis about which the reflecting surface portions are physically symmetrically formed.

Figure 5:
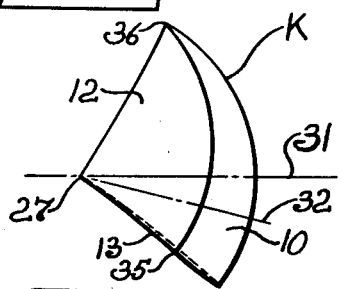
Fig. 5 is a side elevational view of my reflector as evolved in Figs. 1 to 4.
Figure 6:
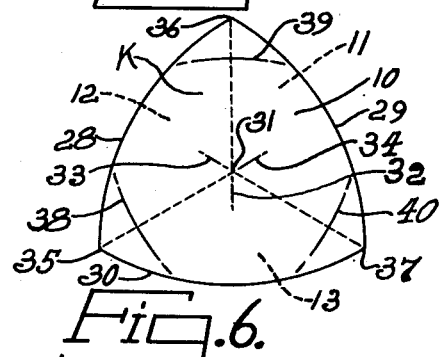
Fig. 6 is a front elevational view of the Fig. 5 reflector.

With the reflector K in the position shown in Figs. 5 and 6, reflecting activity will be equal for light approach laterally to each side of axis 31 whereas for light approach vertically of axis 31 the activity will be greater from below axis 31 because one of the optical axes (32) lies in this vicinity. However, for light approach laterally of axis 31, the other optical axes 33, 34 are symmetrical with respect to axis 31 so that the lateral activity will be equal as aforesaid. Of course, the reflector may be positioned as desired according to taste and requirements, by rotating the reflector to any position about axis 31 and pointing this axis as desired. For use on the rear of road vehicles in general, the position as in Figs. 5 and 6 is deemed favorable with respect to the wide variety of conditions met.

In Fig. 7 I have diagrammatically indicated the reflecting action for a bundle of light rays A, B, C approaching the reflector K parallel to axis 31. Each ray is refracted at surface 10 and then passes through the reflector body to one of the pair of surfaces 11, 12 and on striking this surface each ray is internally reflected to strike the other surface of this pair whence the ray is again internally reflected toward surface 13 and thence passed by refraction out at surface 10 and back approximately to the light source. For convenience of illustration in Fig. 7 the entering light rays are shown as striking very close to the intersection between surfaces 11, 12.

The ray A is at about the outer limit of reflex activity for light approach parallel to axis 31 because a ray above ray A would be reflected by surfaces 11, 12 and pass out at the bottom of surface 10 without striking surface 13. Therefore when the reflector is largely used for light approaching parallel to axis 31 then the portions bounding apices 35, 36, 37 may, if desired, be omitted from the mold and for maximum efficiency for reflecting activity for material employed, the margins of the reflector body adjacent the former apices 35, 36, 37 would then be formed as indicated by boundary lines 38, 39, 40 each curving for maximum efficiency like the adjacent margins of surface 10 at 28, 29, 30.

However, where the reflector is employed for reflection of rays directed obliquely to axis 31 as is almost always the case, then the "corners" or apices 35, 36, 37 are preferably employed because these end zones then become active and increase the reflecting capacity of the reflector. Such condition is illustrated in Fig. 8 for the oblique rays A', A, B, C, D, E. In Figs. 7 and 8 the arrows indicate the path of the rays which are approximately traced through the reflector. Of course the converse of the paths are had by reversing the directions of the arrows illustrated. In the case of rays entering upwardly from below axis 31 and of such obliquity as not to strike the surface 13, as the ray F, I obtain an unusual and beneficial result in that surfaces 11, 12 will coact to return such rays for an auxiliary or supplemental range of activity, thereby causing greater reflex activity of the reflector below than above axis 31. Optical axes 32, 33, 34 are present as illustrated without the double reflection phenomenon just described. Double reflection actually introduces a degree of asymmetry not related to optical axes 32, 33, 34 but nevertheless provides an unusual condition of greatly increased range below axis 32 for the illustrated assumed conditions, a similar action occurring in like relation to the other axes 33 and 34. In the present instance the optical axes represent the respective centers of triple reflecting activity for the three general directions of light approach, one of which is dealt with in Figs. 7 and 8 as illustrated.

Referring to Figs. 9 and 10 I have illustrated one manner of embodying my reflector for use with an ordinary vehicle tail lamp 41 having the usual electrical light bulb 42. This lamp is provided with a cover lens 43 of ordinary ruby color for the usual warning signal. Molded with the lens is my reflector K which functions to return red light from an approaching light source, as from the headlights of another vehicle, especially when the bulb 42 is not energized. The reflector K operates as in Figs. 7 and 8 to warn approaching drivers over a wide range of light approach relative to the reflector axis 31.

In Fig. 11 I have illustrated an alternative lens 44 to which is cemented or molded my reflector K. In practice the reflector is preferably premolded of white transparent plastic and then the lens 44 of red plastic is molded in contact with the reflector so as to fuse therewith. This arrangement affords uniformity in the red color for both the lens 44 and reflector K and is somewhat preferred to the Fig. 9 arrangement. In Fig. 9 a red plastic suitable for the lens 43 tends, in some instances, to be too dark for the thickness of reflector K. This objection is avoided in the Fig. 11 arrangement wherein a uniform thickness of the red plastic is maintained.

Referring to Figs. 12, 12A and 12B, I have illustrated a plastic body 45 formed with a plurality of my reflectors grouped contiguously to one another. This body 45 may be used generally, such as for signs, in place of lens 43 or 44, or wherever the reflex action is desired.

In the particular pattern illustrated the marginal portions of the faces 10 of reflectors K have been cut-back slightly to accommodate their grouping closely together and so that, at the back of the reflector body as in Fig. 12, the corresponding edges 36ª of each group of six reflectors may be arranged to radiate symmetrically from a point or zone 47 so that they are successively spaced apart at 60° angles. The flats 48 extend in a line between adjacent zones 47, these flats progressively increasing in width and then decreasing from one zone 47 to another because of the curvature of the reflecting surfaces 11, 12, 13. When the body 45 is employed as a tail lamp cover these flats provide direct passage of red light from bulb 42 rearward of the vehicle through the body. The groups of six triple reflectors overlap contiguous like groups in that each triple reflector forms a part of three of these groups, except of course at the margins of the body or where only a small portion of the pattern is employed. Other patterns may be arranged by grouping the reflectors K as desired.

In the Fig. 12 pattern grouping it will be noted that in each group of six reflectors formed symmetrically about a point 47, three of the group are oriented as in Figs. 5 to 8 whereas the remaining three are oriented 180° about axis 31 with respect to the first said three reflectors. This arrangement is advantageous in affording equal reflecting range for light approach up and down with respect to any axis 31 and also equal range laterally to each side of such axis. The Fig. 12 grouping thus presents a desirable efficient grouping not only from the standpoint of arranging a maximum number of reflectors of a given size for a given body area but also from the standpoint of reflecting efficiency and range uniformity.

In molding the body 45 the same general well known method may be employed as is now widely used in molding multiple triple reflector bodies of the type in which each reflector is a cube corner. This method consists in providing a bundle of pencils having molding ends formed to shape the rear face. In molding the body 45 the pencil clusters will obviously have a diamond shaped cross-section with ends provided with a lapped convex spherical surface so that each pencil forms a pair of reflecting concave surfaces adjacent one of the flats 48. The companion mold for forming the front face of body 45 may be conveniently fashioned with the desired spherical recesses by cutting the mold with an appropriate milling cutter and then polishing the spherical recesses.

In the modification of my invention shown in Figs. 13 to 17, the Fig. 17 reflector O may be visualized by a geometrical demonstration corresponding to that shown in Figs. 1 to 4. This modification employs certain optical relationships including certain characteristics of the hyperbola and ellipse. Thus, rays of light originating at one focus of a hyperboloidal surface will reflect from the surface as though they came from the other focus. Also, rays of light originating at one focus of an elliptical surface will reflect from the surface and pass through the other focus.

With the above in mind the geometrical visualization comprises three intersecting hyperboloids of revolution P, Q, and R. An element of the hyperboloid R is shown at 49 in Fig. 16 having focii 50, 51 along axis 52 about which element 49 is revolved to form the hyperboloid R. 49ª represents the conjugate hyperbola. The element 49 intersects line 53 at point 54, the line 53 being perpendicular to axis 52 and passing through point 51, this line 53 eventually forming the mechanical axis of reflector O corresponding to axis 31 of reflector K.

In geometrically forming the hyperbola 49, any of several methods may be followed. One convenient method comprises drawing a line 52 and describing any semi-circle with center X on line 52 and intersecting the latter at Y and Z. The size of the semi-circle selected will determine the ultimate size of the reflector O geometrically developed. Next I erect a perpendicular 53 to line 52 so located that the distance from Y to 51 is one half the distance from 51 to Z. I then construct line 52ᵇ tangent to semi-circle 52ª at the point of intersection 54 of the semi-circle with line 53, this tangent intersecting line 52 at point 50. I then construct hyperbola 49 passing through point 54 and having points 51, 50 as its focii. The ellipse 55 may then be constructed having focii 51 and 50. By rotating hyperbola 49 about line 52 one of the three reflecting surfaces of the reflector is formed, ellipse 55 representing the intersection of the other two similar reflecting surfaces. I then construct the portion of the elliptical surface 57, this surface being formed by revolving ellipse 57ª about line 52 as an axis. The ellipse 57ª has its focii at 51 and 54 and is of such eccentricity determined by the refraction coefficient of the plastic material that rays of light approaching parallel to axis 53 will be refracted through focus 51 or as though these rays would pass through this focus but for the triple reflecting surfaces of reflector O.

Now by bringing together and intersecting three similar hyperboloids as in Figs. 13, 14 such that focus 51 is common to each and such that their axes of revolution 52 lie in a common plane and are spaced 120° apart from each other, the resulting geometrical concept will appear as in Fig. 14. Under these conditions the lines of intersection formed by the hyperboloidal surfaces are true ellipses each having focii located at 50, 51 on one of the axes 52. A typical relationship of this character is illustrated in Fig. 16 wherein the intersection of a pair of the hyperboloids is defined by element 55 which is an ellipse having focii 50, 51 and wherein 52 is the major axis and 56 the minor axis.

The reflector O has its three reflecting surfaces formed by the surface portions of hyperboloids P, Q, R bounding or lying adjacent to the center of one of the cavities formed by the intersecting hyperboloids as illustrated in Fig. 15. The reflecting surfaces are therefore hyperboloidal concave segments. The cavity center is the apex of reflector O at 54. This reflector is provided with a condensing surface 57 which is essentially an ellipsoid of revolution about axis 53. An element of the ellipse is shown at 57ª in Fig. 16 having focii 51, 54 and major and minor axes 53 and 58 respectively.

The condensing surface 57 is so formed that, in conjunction with the triple reflecting surfaces, light approaching the reflector will be returned to the light source as in the case of reflector K. The magnitude of the ellipse may be determined by trial or geometrically to suit desired conditions, there being an optimum ellipse for each refractive index of transparent plastic which may be used. For usual conditions where the plastic has a refractive index approximating 1.5, the ellipse 57ª with a focal point at or close to point 54 may be employed for practical purposes, it being noted that the end shape of this ellipse approximates, over the majority of its length, a segment of a circle with center at 54.

It will be apparent that Fig. 16 is an enlargement of that portion of the geometrical concept as viewed in Fig. 15 in the vicinity of the aforesaid cavity formed by the intersecting hyperboloids. In appearance to the eye on casual observation, the reflector O will appear generally similar to reflector K and its functions are practically the same including location of mechanical and optical axes. The reflector O may therefore be used interchangeably with reflector K in Figs. 5 to 12B. For these reasons I have not duplicated these figures with respect to reflector O especially as such drawing representation would appear to the eye to be a duplication.

In Fig. 16 the rays A, B, C are refracted at the condensing surface 57 for direction toward the focal point 51. It is again presumed that these rays strike so close to an intersection of two of the reflecting surfaces that the ellipse 55 may be taken as the reflecting element. Thus these rays which are directed as at 59 toward the focus 51 of ellipse 55 are reflected at the ellipse as though they were coming as at 60 from the other focus 50. Then, on reaching the third hyperboloidal surface from a direction originating at hyperboloid focus 50 they are reflected as at 61 as though coming from the other hyperboloid focus 51. Ray A is a limiting ray of a type parallel to axis 53 above this axis corresponding to ray A in Fig. 7. Ray E is of the oblique type corresponding to ray F in Fig. 8. In Fig. 17 the reflecting action is illustrated for typical oblique rays A, B, C.

In both reflectors K and O, it is important that I have provided a reflector which utilizes a smooth convex condensing surface in collimating relationship with respect to the triple reflecting surfaces which are of smooth concave curvature. Such arrangement inherently tends to minimize undesired spread of the reflected light due to minute irregularities in the molded surfaces, as the collimating front face acts to refract the rays, on leaving the reflector, in the direction of the entering ray. Such action affords greater reflecting efficiency than in the case of plane or substantially plane front surfaces for triple reflectors of conventional type. Such errors, instead of being magnified in the case of the conventional reflector, are minimized with my reflector. The condensing surfaces 10 and 57 are moreover of pronounced curvature inasmuch as, in each instance, the locus of curvature centers lies at or approximately at the apex of the triple reflecting surfaces where the lines of intersection of these surfaces meet or would meet if prolonged in a reflector having the apex cut off, assuming of course the ordinary condition when the plastic material used has a refracting index approximating 1.5.

The Fig. 17 reflector is subject to molding methods just as outlined for the Fig. 8 reflector, the pencils and companion mold having appropriately shaped surfaces.

The triple reflecting surfaces of reflectors K and O are each portions of a surface of revolution, each surface portion being of concave form.

It will be apparent from Figs. 8 and 16 that, with light approach from below the mechanical axes of these reflectors of the order of ray F in Fig. 8 and ray E in Fig. 16, the bottom face of the reflector is inactive, the remaining two faces providing the reflecting action in the order of a double reflector. This greatly increases the overall activity and efficiency of the reflectors. Obviously there are three general directions of oblique light approach of this order, these directions being in the vicinity of the three optical axes 32, 33, 34 of the reflector K and corresponding optical axes of the reflector O. The triple reflecting action occurs in each instance over a wide range around and adjacent the mechanical axis whereas the double reflecting action occurs in three zones or ranges oblique to this axis.

I claim:

1. A reflector of the retro-directive type having a light-receiving curved front face and a rear face comprising three reflecting surfaces disposed in triple reflecting relationship with respect to each other, each of said reflecting surfaces constituting a portion of a hyperbolic surface of revolution, said three reflecting surfaces defining an apex of relative intersection, the locus of curvature centers of said front face lying approximately at said apex.

2. A reflector of the retro-directive type having a light-receiving curved front face and a rear face comprising three reflecting surfaces disposed in triple reflecting relationship with respect to each other, each of said reflecting surfaces being concave and constituting a portion of a hyperbolic surface of revolution, said three reflecting surfaces defining an apex of relative intersection, the locus of curvature centers of said front face lying approximately at said apex.

3. A reflector of the retro-directive type having a light-receiving front face and a rear reflecting face geometrically comprising portions of the surfaces of three intersecting spheres which have equal radii and which have their sphere centers relatively spaced the same distance from each other which distance is greater than said sphere radius and of such magnitude that conjugate tangents of any pair of said spheres lie at approximately 90° with each other, said front face being curved in collimating relation with respect to said reflecting face portions and cooperating therewith optically to return light entering said front face approximately toward the light source.

4. A reflector of the retro-directive type having a light-receiving front face and a rear reflecting face geometrically comprising portions of the surfaces of three intersecting spheres which have equal radii and which have their sphere centers relatively spaced the same distance from each other which distance is greater than said sphere radius and of such magnitude that conjugate tangents of any pair of said spheres lie at approximately 90° with each other, said front face constituting a portion of an approximate sphere and disposed in collimating relation with respect to said reflecting face portions and cooperating therewith optically to return light entering said front face approximately toward the light source.

5. A reflector of the retro-directive type having a light-receiving front face and a rear reflecting face geometrically comprising portions of the surfaces of three intersecting hyperbolas of revolution so arranged that their axes of revolution lie 120° from each other in a common plane radiating from a focus common to said hyperbolas of revolution, said front face being curved in collimating relation with respect to said reflecting face portions and cooperating therewith optically to return light entering said front face approximately toward the light source.

6. A reflector of the retro-directive type having a light-receiving front face and a rear reflecting face geometrically comprising portions of the surfaces of three intersecting hyperbolas of revolution so arranged that their axes of revolution lie 120° from each other in a common plane radiating from a focus common to said hyperbolas of revolution, said front face constituting a portion of a surface of revolution generated by an approximate ellipse having one of its focii disposed approximately at said common focus and revolved about an axis containing said common focus and the mechanical axis of the reflector.

7. A reflector of the retro-directive type comprising a plastic body molded to form a light-receiving mold-smooth curved front face, and a mold-smooth rear face comprising three reflecting surfaces disposed in triple reflecting relationship with respect to each other, each of said reflecting surfaces constituting a portion of a spherical surface, said three reflecting surfaces defining an apex of relative intersection, the locus of curvature centers of said front face lying approximately at said apex, said front face and said three reflecting surfaces defining an optical system of such geometrical pattern as to theoretically operate to return light, which enters said front face parallel to the mechanical axis of the reflector, back to the light source in a direction truly parallel with respect to the direction of entering light, but which actually operates to return said light with deviation from said truly parallel relationship to an extent occasioned by reason of unavoidable inaccuracies inherently incidental to molding said body to said geometrical pattern.

8. A reflector according to claim 7, wherein, each of said reflecting surfaces is concave.

9. A reflector according to claim 7, wherein, said front face constitutes a portion of a spherical surface.

10. A reflector according to claim 7, wherein, each of said reflecting surfaces is concave, said front face being convex and constituting a portion of a spherical surface.

11. A reflector of the retro-directive molded plastic type comprising a front condensing portion and an internally reflecting rear portion, said condensing portion having a curved light-receiving mold-smooth front face, said reflecting portion having three reflecting mold-smooth curved surfaces disposed in triple reflecting relationship with respect to each other, said three reflecting surfaces defining an apex of relative intersection, the locus of curvature centers of said front face lying approximately at said apex, each of said reflecting surfaces being of such curvature in optical relationship with each other and with said front face as to provide an optical system theoretically operable to return light, which enters said front face parallel to the mechanical axis of the reflector, back to the light source in a direction truly parallel with respect to the direction of entering light, but which actually operates to return said light with deviation from said truly parallel relationship to the extent occasioned by reason of unavoidable inaccuracies inherently incidental to molding said body to said theoretically operating optical relationship.

12. A reflector of the retro-directive type having a light-receiving front face and a rear face comprising three reflecting surfaces disposed in triple reflecting relationship with respect to each other, each of said reflecting surfaces constituting a portion of a hyperbolic surface of revolution, said front face constituting a portion of an elliptical surface of revolution.

13. A reflector of the retro-directive type having a light-receiving front face and a rear face comprising three reflecting surfaces disposed in triple reflecting relationship with respect to each other, each of said reflecting surfaces being concave and constituting a portion of a hyperbolic surface of revolution, said front face being convex and constituting a portion of an elliptical surface of revolution.

14. A reflector of the retro-directive molded plastic type comprising a front condensing portion and an internally reflecting rear portion, said condensing portion having a convex light-receiving mold-smooth front face, said reflecting portion having three reflecting mold-smooth surfaces disposed in triple reflecting relationship with respect to each other, each of said reflecting surfaces being concave and defining an apex of relative intersection, the locus of curvature centers of said front face lying approximately at said apex, said three reflecting surfaces being of such curvature in optical relationship with each other and with said front face as to provide an optical system theoretically operable to return light, which enters said front face parallel to the mechanical axis of the reflector, back to the light source in a direction truly parallel with respect to the direction of entering light, but which actually operates to return said light with deviation from said truly parallel relationship to the extent occasioned by reason of unavoidable inaccuracies inherently incidental to molding said body to said theoretically operating optical relationship.

JOHN B. DICKSON.